US012348381B1

(12) United States Patent
Glozman et al.

(10) Patent No.: US 12,348,381 B1
(45) Date of Patent: Jul. 1, 2025

(54) SYSTEM, METHOD, AND COMPUTER PROGRAM FOR INTENT TRANSLATION TO TOSCA IN INTENT-BASED NETWORKING

(71) Applicant: Amdocs Development Limited, Limassol (CY)

(72) Inventors: Borislav Glozman, Ramat Gan (IL); Avi Chapnick, Ramat Gan (IL); Roy Segal, Mishmar-David (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 85 days.

(21) Appl. No.: 18/236,863

(22) Filed: Aug. 22, 2023

(51) Int. Cl.
*H04L 41/14* (2022.01)
*G06F 40/30* (2020.01)
*G06F 40/40* (2020.01)

(52) U.S. Cl.
CPC ............ *H04L 41/145* (2013.01); *G06F 40/30* (2020.01); *G06F 40/40* (2020.01)

(58) Field of Classification Search
None
See application file for complete search history.

(56) References Cited

U.S. PATENT DOCUMENTS 9,621,428 B1 * 4/2017 Lev ...................... H04L 41/0806
2019/0347282 A1 * 11/2019 Cai ........................ G06N 5/022

* cited by examiner

*Primary Examiner* — Fadi Haj Said
(74) *Attorney, Agent, or Firm* — Zilka-Kotab, P.C.

(57) ABSTRACT

As described herein, a system, method, and computer program are provided for intent translation to Topology and Orchestration Specification for Cloud Applications (TOSCA) in intent-based orchestration. A microservice of a service and network orchestrator receives an intent defined in a first format associated with a first standard used for modeling and management of network services. The microservice translates the intent defined in the first format to a second format associated with a TOSCA-based model used for modeling and management of network services, to form the intent defined in the second format. The microservice outputs the intent defined in the second format.

15 Claims, 7 Drawing Sheets

SYSTEM, METHOD, AND COMPUTER PROGRAM FOR INTENT TRANSLATION TO TOSCA IN INTENT-BASED NETWORKING

FIELD OF THE INVENTION

The present invention relates to intent-based network management and orchestration.

BACKGROUND

Intent-based networking, including network management and orchestration, is one of the prominent tools in automation of modern networks and services. It refers to a form of network administration that incorporates modern computer technologies, such as machine learning, to automate administrative tasks across a network. Intent-based networking reduces the complexity of creating, managing and enforcing network policies and also reduces the manual labor associated with traditional configuration management.

In general, in intent-based orchestration, an intent-based command is issued by a user, usually from a non-technical business perspective. The command is provided in a natural language and describes a request for a service, rather than how to implement the request. The particular intent of the user is derived from the command, and the intent is then translated to actions that are performed to achieve the user's intent.

Several standardization bodies define intent and its handling. However, there is no consensus among the standards on a single intent representation and implementation method. There is thus a need for addressing these and/or other issues associated with the prior art. For example, due to the availability of multiple intent models, there is a need to translate from the existing intent-based networking standards to a single model that can be used for intent-based management of a service or network by a service and network orchestrator, and vice versa.

SUMMARY

As described herein, a system, method, and computer program are provided for intent translation to Topology and Orchestration Specification for Cloud Applications (TOSCA) in intent-based networking. A microservice of a service and network orchestrator receives an intent defined in a first format associated with a first standard used for modeling and management of network services. The microservice translates the intent defined in the first format to a second format associated with a TOSCA-based modelused for modeling and management of network services, to form the intent defined in the second format. The microservice outputs the intent defined in the second format.

DETAILED DESCRIPTION

Figure 1:
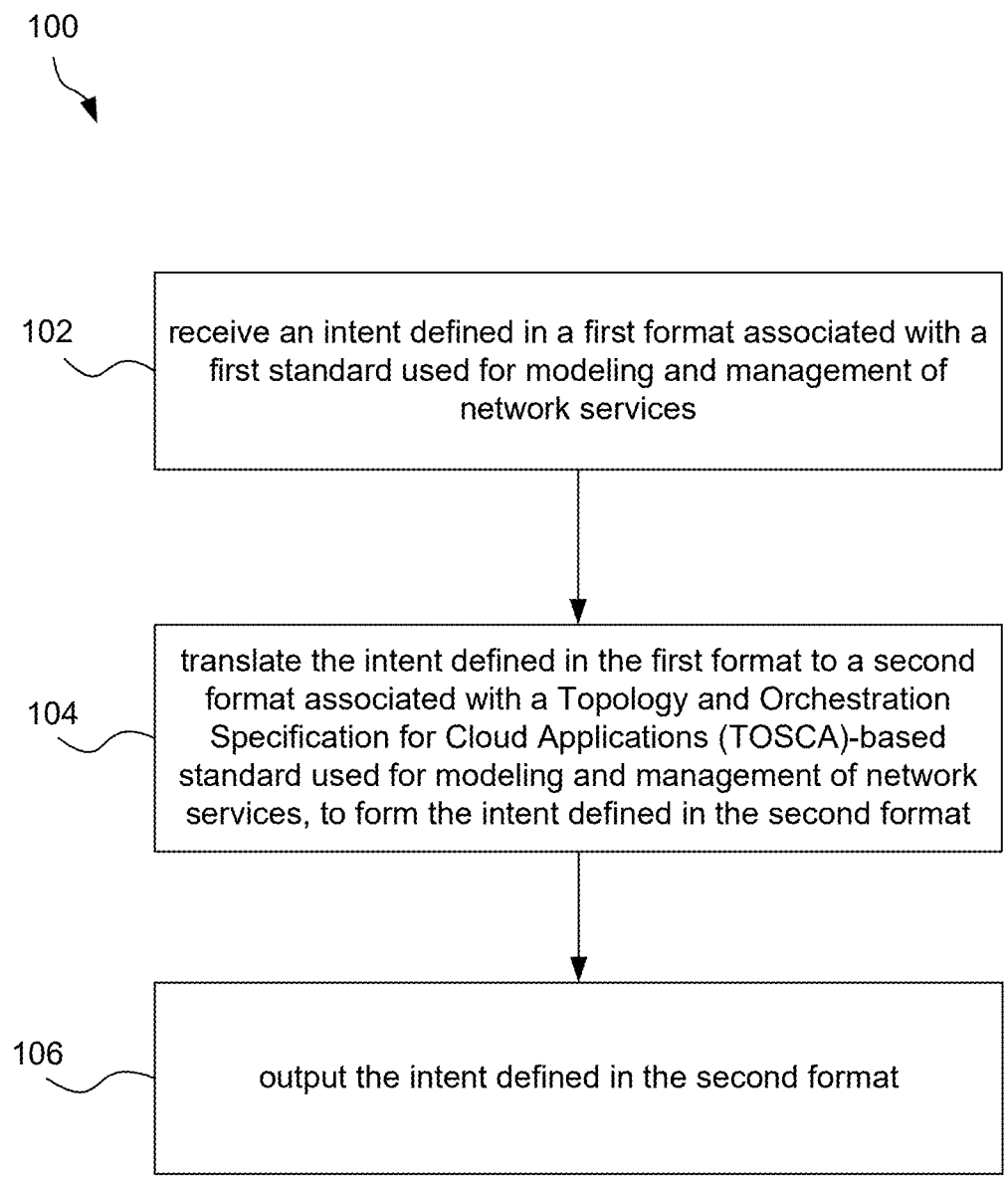
FIG. 1 illustrates a method for intent translation to TOSCA in intent-based orchestration, in accordance with one embodiment.

FIG. 1 illustrates a method 100 for intent translation to TOSCA in intent-based orchestration, in accordance with one embodiment. The method 100 may be carried out by a computer system, such as that described below with respect to FIGS. 6 and/or 7. For example, the method 100 may be performed by a computer system providing intent-based orchestration.

With respect to the present description, the intent-based orchestrationrefers to a method and system of network management and orchestration in which network tasks are automatically performed based on the intent derived from user input (natural language) commands. In an embodiment of intent-based orchestration, a command input by a user is processed to determine an intent of the user. The intent can then be processed to determine actions to take to achieve the user's intent.

In the context of the present embodiment, the method 100 is performed by a microservice of a service and network orchestrator. The service and network orchestrator is a TOSCA-based orchestrator, or in other words operates according to a TOSCA standard (model) and accordingly using a TOSCA-based format. The service and network orchestrator is configured to process user intents, as described above, to take action within the network accordingly. The microservice refers to computer logic and/or a computer process that executes to perform the method 100 as described herein.

In operation 102, an intent defined in a first format associated with a first standard used for modeling and management of network services is received. In an embodiment, the intent defined in the first format may be a formal description of a request associated with a service. The request may be to create a new service in a network, terminate an existing service in the network, modify an existing service in the network, etc. The service may refer to a business service or a network service.

In an embodiment, the intent defined in the first format may be generated based on a natural language input provided by a user. The natural language input may be a command associated with the service. In an embodiment, the natural language input may be processed to generate the intent defined in the first format, or in other words the intent defined in the first format may be derived from the natural language input.

In an embodiment, the intent defined in the first format may be generated by a service and network orchestrator that operates in accordance with the first standard. As a result the service and network orchestrator may generate the intent defined in the first format associated with the first standard. In an embodiment, the service and network orchestrator that generates the intent defined in the first format may be different from the TOSCA-based orchestrator described above.

In operation 104, the intent defined in the first format is translated to a second format associated with a TOSCA-based standard used for modeling and management of network services, to form the intent defined in the second format. Accordingly, the second format refers to a format that is different from the first format. The format may refer to parameters and/or values used to define an intent.

In an embodiment, the intent defined in the first format may be translated to the second format by using at least one of mappings or policies. In an embodiment, the intent defined in the first format may be translated to the second format by further using one or more of calculations, constraints, requirements, or capabilities.

In an embodiment, the intent defined in the first format may be translated to the second format by using one or more of textual mapping of properties, wildcard mapping, or rule-based mapping. In an embodiment, the intent defined in the first format may be translated to the second format by using machine learning based mapping. In an embodiment, the intent defined in the first format may be translated to the second format by using generative artificial intelligence (AI) based mapping.

In one exemplary implementation, the first format may be configured to define intents using a first proprietary set of parameters (i.e. proprietary to the service and network orchestrator that generates the intent defined in the first format). The first proprietary set of parameters may include one or more of properties, constraints, expectations, goals, or reports. Further to this example, the intent defined in the first format may be translated to the second format by translating parameters of the intent defined in the first format. Still yet, the second format may be configured to define intents using a second proprietary set of parameters, and parameters of the intent defined in the first format may then be translated to parameters included in the second proprietary set of parameters. For example, the second proprietary set of parameters may include one or more of data types, properties, artifacts, capabilities, requirements, relationships, interfaces, nodes, or policies.

In operation 106, the intent defined in the second format is output. In an embodiment, the intent defined in the second format may be output for use by the service and network orchestrator (i.e. the TOSCA-based orchestrator). For example, the service and network orchestrator may perform one or more actions that achieve the intent.

In another embodiment, the intent defined in the second format may be output for translation to a third format associated with a third standard used for modeling and management of network services. The third standard may be employed by a third service and network orchestrator that operates using the third format. Accordingly, the intent defined in the second format may be translated to the third format (e.g. by the same microservice disclosed above).

To this end, the method 100 may be performed to provide intent translation to TOSCA in intent-based orchestration. While numerous different standards exist in accordance with which intents can be generated, the method 100 may be provided to translate those intents to a common, TOSCA-based model. This translation may be provided when the intent is to be processed by a TOSCA-based orchestrator to achieve the intent in the network, in an embodiment. In another embodiment, the translation may be provided when the intent is to be further translated to a third format for processing by another orchestrator that operates using the third format.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
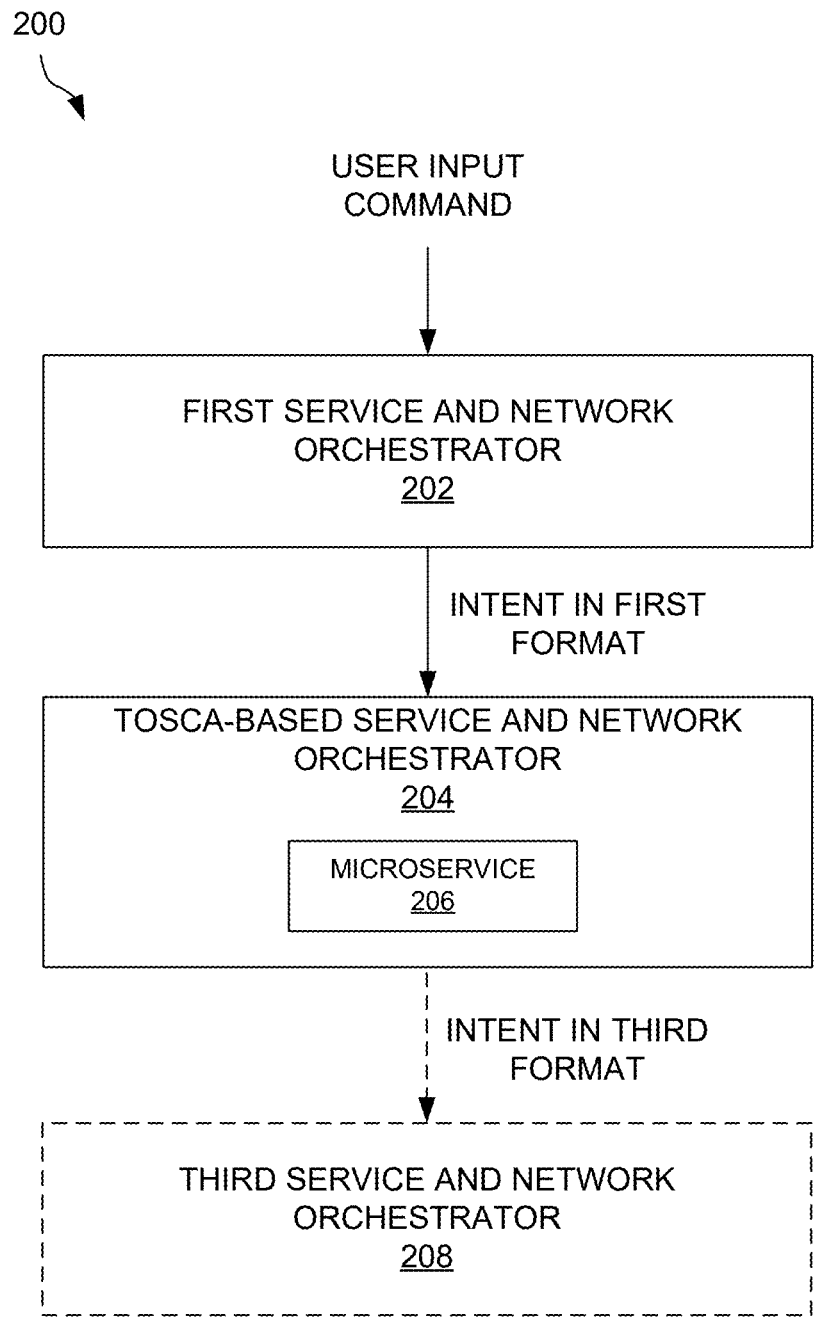
FIG. 2 illustrates a system for intent translation to TOSCA in intent-based orchestration, in accordance with one embodiment.

FIG. 2 illustrates a system 200 for intent translation to TOSCA in intent-based orchestration, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a first service and network orchestrator 202. In the present embodiment, the first service and network orchestrator 202 operates in accordance with a first standard. The first service and network orchestrator 202 receives a user input command and generates an intent of the command in a first format associated with the first standard.

The system 200 also includes a TOSCA-based service and network orchestrator 204. The TOSCA-based service and network orchestrator 204 operates in accordance with a TOSCA standard. The TOSCA-based service and network orchestrator 204 includes a microservice 206 that translates the intent defined in the first format to a second (TOSCA-based) format that corresponds to the TOSCA standard.

In an embodiment, the TOSCA-based service and network orchestrator 204 may the perform actions in the network to achieve the intent, as defined in the second format. In another optional embodiment, the TOSCA-based service and network orchestrator 204 may further translate the intent defined in the second format to an intent defined in a third format. The third format may correspond to a standard of a third service and network orchestrator 208. In this way, the third service and network orchestrator 208 may perform actions in the network to achieve the intent, as defined in the third format.

In this way, the system 200 may include a microservice 206, or adaptor layer, of the TOSCA-based service and network orchestrator 204 which can translate intents in various different formats into a common TOSCA-based format with all its features (e.g. properties, requirements, capabilities, containment, etc.). The orchestrator 204 will be able to perform its activities based on this common TOSCA-based format. In case of a need to utilize another (e.g. intent based domain) orchestrator 208, the intent in the common TOSCA-based format may be further translated by the microservice 206 into one of the formats supported by such orchestrator 208.

For example, in general intent may refer to a formal description of a required service (e.g. business, network, etc.) describing what is requested, rather than how to implement the request. Multiple standards organizations define intent differently:
   1. TeleManagement™ Forum define intent using ontology defined in TMF 291, using Resource Description Framework Schema/Web Ontology Language (RDFS/OWL) modeling and REST application programming interfaces (APIs).

2. 3rd Generation Partnership Project (3GPP) defines intent (TS 28.312) using network resource model (NRM), Information Object Classes (IOCs) and Data-Types.
3. European Telecommunications Standards Institute Zero-touch network and Service Management (ETSI ZSM) has in "ETSI GR ZSM 005" its defined format to describe intents (Dynamic Service Descriptors). It further explores Intents in "ETSI GR ZSM 011".

Common features of intent management and orchestration are:
Intent Semantics
Intent Knowledge base
Intent Life Cycle Management (Instantiation, Modification, Deletion, etc.)
Intent Reporting
Intent Federation
Intent Closed Loops There are several Orchestration Open Source projects (e.g. Open Network Automation Platform (ONAP), Optical Networking Services (ONS)), as well as proprietary products, that utilize TOSCA for modeling and management of services. Therefore, there is a need in translation of the intents defined by these different orchestration systems into TOSCA-based intents and vice versa.

The system 200 of the present embodiment provides that translation.

There are common concepts that an intent is based on: Properties, constraints, expectations, goals, reports, etc. TOSCA implements those concepts using features defined in its standard (e.g., Data Types, Properties, Artefacts, Capabilities, Requirements, Relationships, Interfaces, Nodes, Policies, etc.). In an embodiment, the translation mechanism from each of those intent types into TOSCA can be based on mapping, policies, calculations, constraints, requirements and capabilities. There is a need to apply logic in order to translate intent into a TOSCA-based format. Therefore, a computer program (a microservice 206) is needed for such task. This microservice 206 can be called an adaptor from one intent type (format) to TOSCA. The same or similar adaptor can be for translating TOSCA based intents into intents of a different format (type).

The adaptor may hold the translation logic as a pluggable and extendable knowledge base (e.g. mapping rules), defining specific textual mapping of properties, wildcard mapping, rule-based mapping, and even Machine-Learning or even Generative-AI based mapping. The implementation details of such adaptor can vary between one Intent type to another. In this way, the system 200 may provide interoperability and seamless communication between intent orchestrators operating based on different intent formats.

Figure 3:
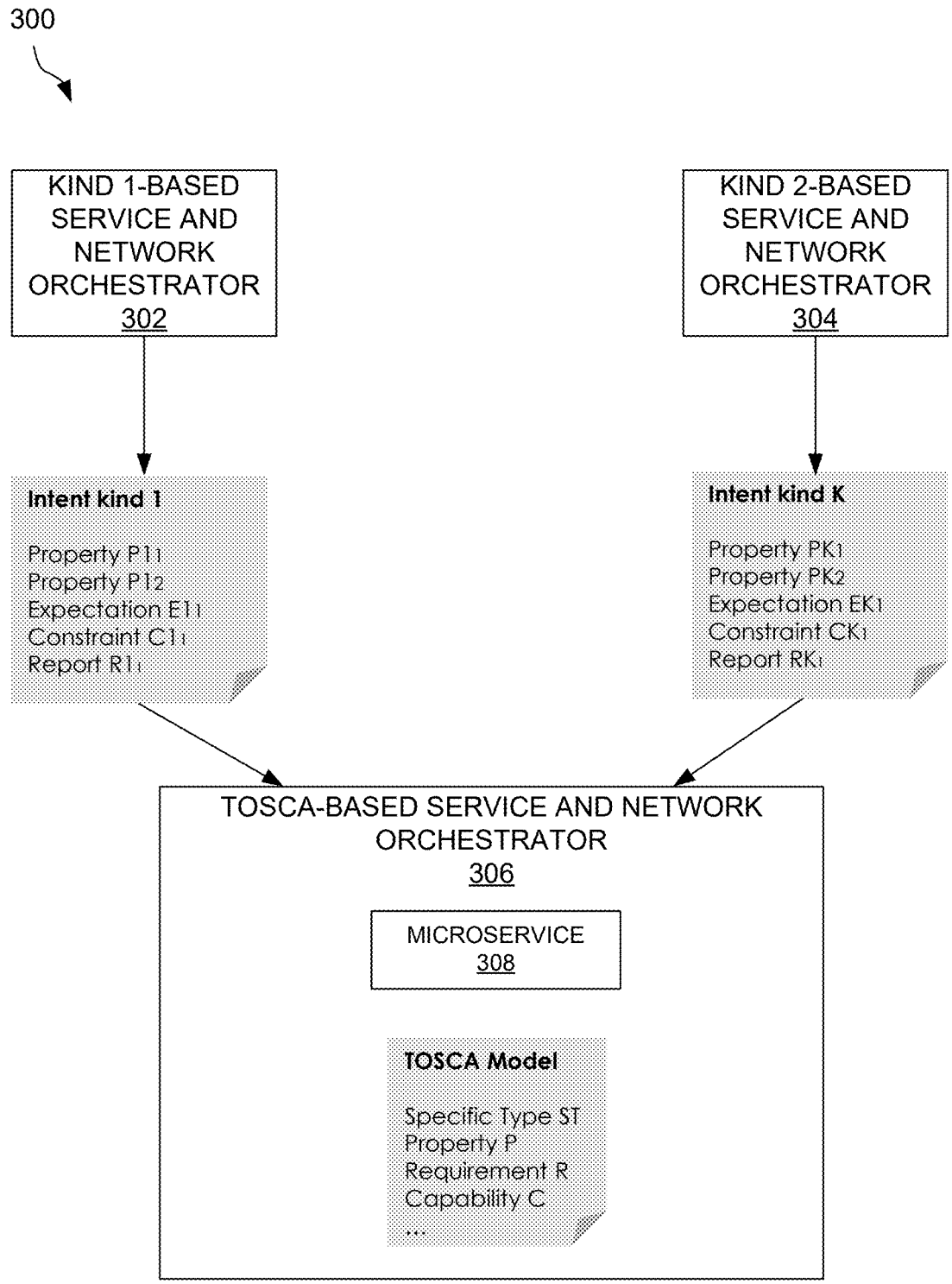
FIG. 3 illustrates a flow diagram of a system for translating an intent in a particular format to a TOSCA-based format for use by a TOSCA-based orchestrator, in accordance with one embodiment.

FIG. 3 illustrates a flow diagram of a system 300 for translating an intent in a particular format to a TOSCA-based format for use by a TOSCA-based orchestrator, in accordance with one embodiment. As an option, the system 300 may be implemented in the context of the details of the previous figure and/or any subsequent figure(s). Of course, however, the system 300 may be implemented in the context of any desired environment. Further, the aforementioned definitions may equally apply to the description below.

As shown, different service and network orchestrators 302, 304, are configured in accordance with different intent-based standards, and thus operate using different intent formats. Intents from these orchestrators 302, 304 is processed by a microservice 308 of a TOSCA-based service and network orchestrator 306 to translate these intents to a TOSCA-based format (i.e. in accordance with a defined TOSCA model). The TOSCA-based service and network orchestrator 306 may then process the intents in the TOSCA-based format to determine which actions to take to achieve the intents in the network.

Figure 4:
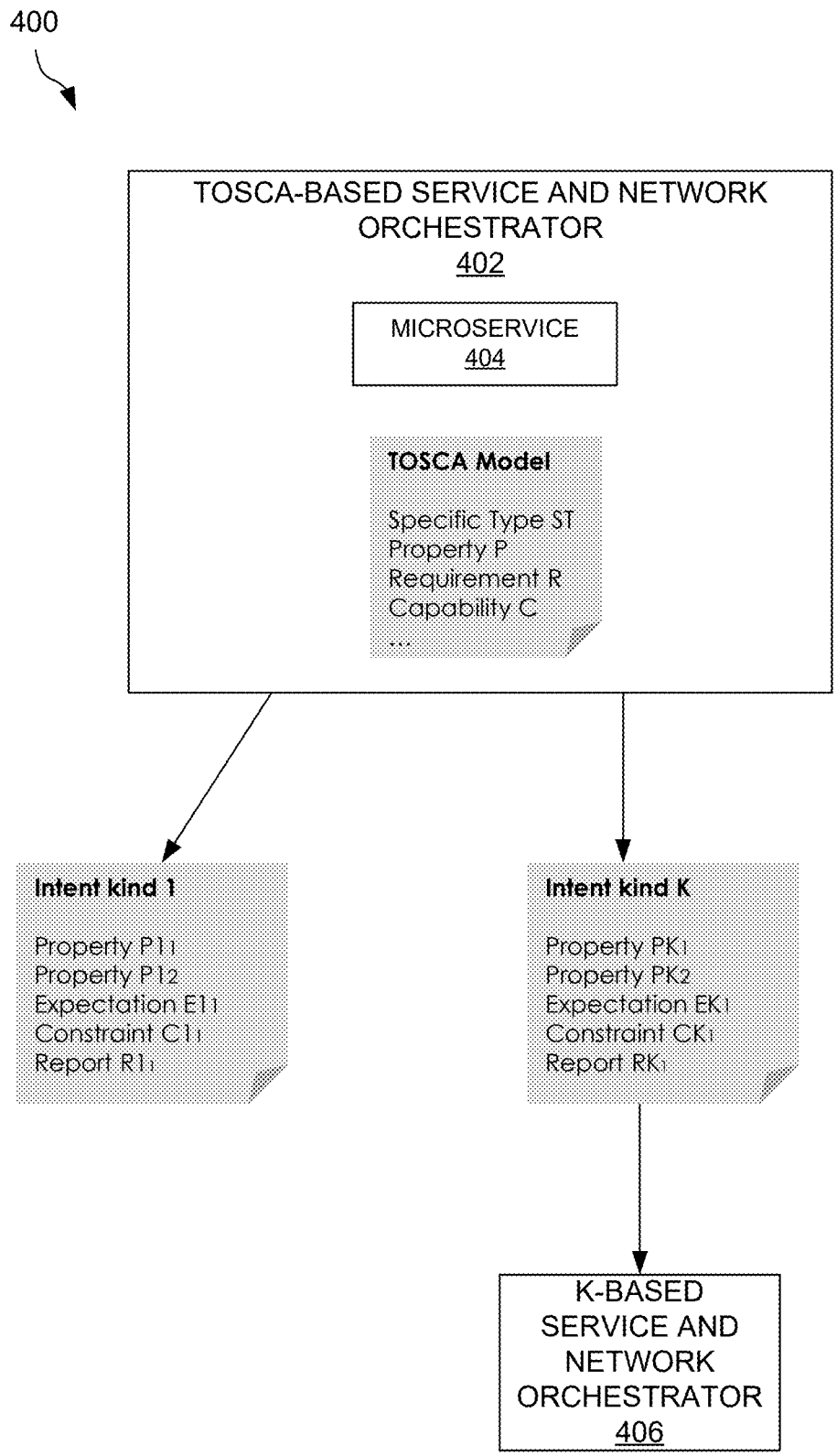
FIG. 4 illustrates a flow diagram of a system for translating an intent in a TOSCA-based format to another specified format for use by an orchestrator configured to operate using the specified format, in accordance with one embodiment.

FIG. 4 illustrates a flow diagram of a system 400 for translating an intent in a TOSCA-based format to another specified format for use by an orchestrator configured to operate using the specified format, in accordance with one embodiment. As an option, the system 400 may be implemented in the context of the details of the previous figure and/or any subsequent figure(s). Of course, however, the system 400 may be implemented in the context of any desired environment. Further, the aforementioned definitions may equally apply to the description below.

As shown, a microservice 404 of a TOSCA-based service and network orchestrator 402 can translate intents in a TOSCA-based format to other formats used by other service and network orchestrators (e.g. orchestrator 406 as shown). These other service and network orchestrators may accordingly process the intents in their respective required formats to determine which actions to take to achieve the intents in their respective network.

Figure 5:
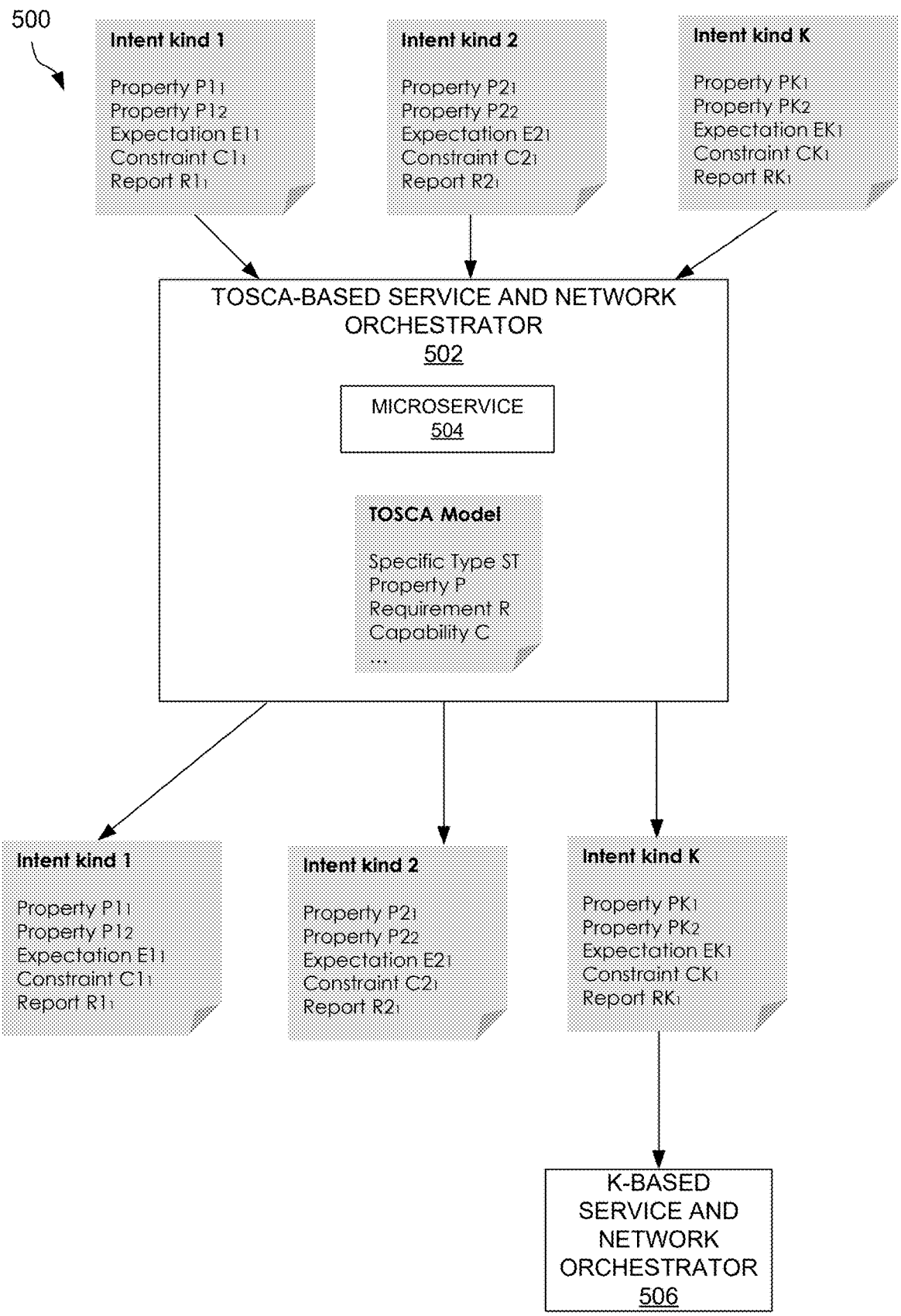
FIG. 5 illustrates a flow diagram of a system for translating an intent between two orchestrator specific formats via use of an intermediate TOSCA-based format, in accordance with one embodiment.

FIG. 5 illustrates a flow diagram of a system 500 for translating an intent between two orchestrator specific formats via use of an intermediate TOSCA-based format, in accordance with one embodiment. As an option, the system 500 may be implemented in the context of the details of the previous figure and/or any subsequent figure(s). Of course, however, the system 500 may be implemented in the context of any desired environment. Further, the aforementioned definitions may equally apply to the description below.

As shown, intents defined in different formats by the orchestrators that generated them are input to a TOSCA-based service and network orchestrator 502. A microservice 504 of the TOSCA-based service and network orchestrator 502 translates these intents to a TOSCA-based format (i.e. in accordance with a defined TOSCA model). In turn, the microservice 504 translates the intents in the TOSCA-based format to other formats used by other service and network orchestrators (e.g. orchestrator 506 as shown). These other service and network orchestrators may accordingly process the intents in their respective required formats to determine which actions to take to achieve the intents in their respective network.

Exemplary Embodiment

In one exemplary implementation of the method 100 of FIG. 1, a communication service (e.g. augmented reality/virtual reality (AR/VR)) is provided based on a network slice of a mobile network.

The communication service is instantiated when a request with an intent, arrives to the end to end (E2E) Service Orchestrator. The request has several properties: service type, location, isolation, etc. as well as Quality of Service expectations (latency, throughput, reliability, availability, jitter, etc.).

The intent is fulfilled by an E2E orchestrator that provides TOSCA model-based orchestration for communication services. The intent is translated to those TOSCA modeled services (e.g. network with many parameters including the ones required by the intent, as well as others). The communication service is fulfilled by Network Services (multiple-RAN, Core, Transport). The radio access network (RAN) Network Service is fulfilled by a RAN orchestrator that has open RAN (ORAN) standard interfaces and models. The Core Network Service is fulfilled by a 3GPP Management System that implements 3GPP intent-based Information Object Classes. The Transport is implemented using TMF Intent-based APIs and knowledge.

Hence there is a need to translate the initial communication service intent into TOSCA models, as well as translate TOSCA models into the different domain intent models.

Intent Reports also need to be translated from one domain format to another, automatically corelated, aggregated and reported.

Assurance needs to be performed on the communication service as well as each network service, each in its respective domain.

Figure 6:
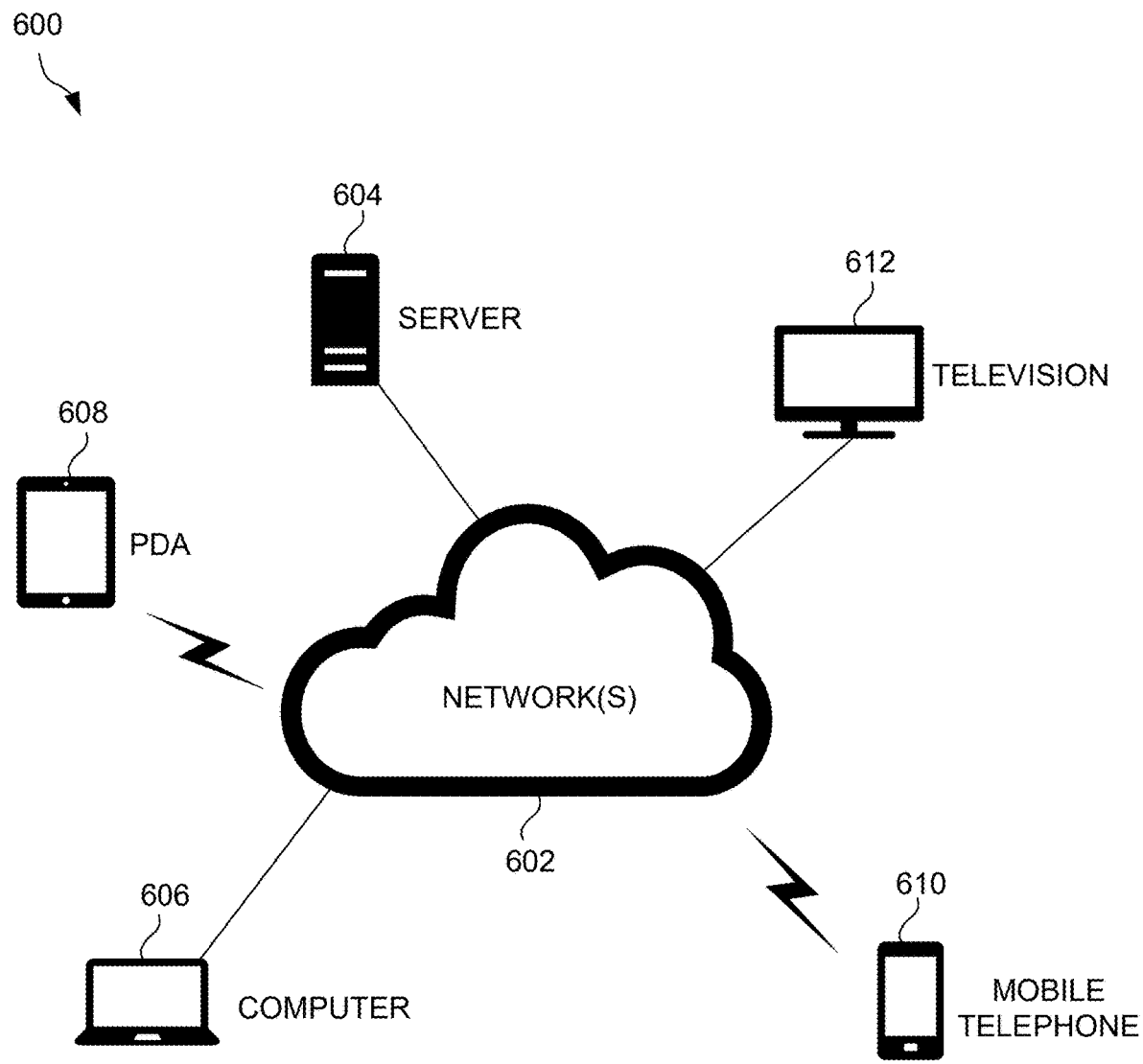
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
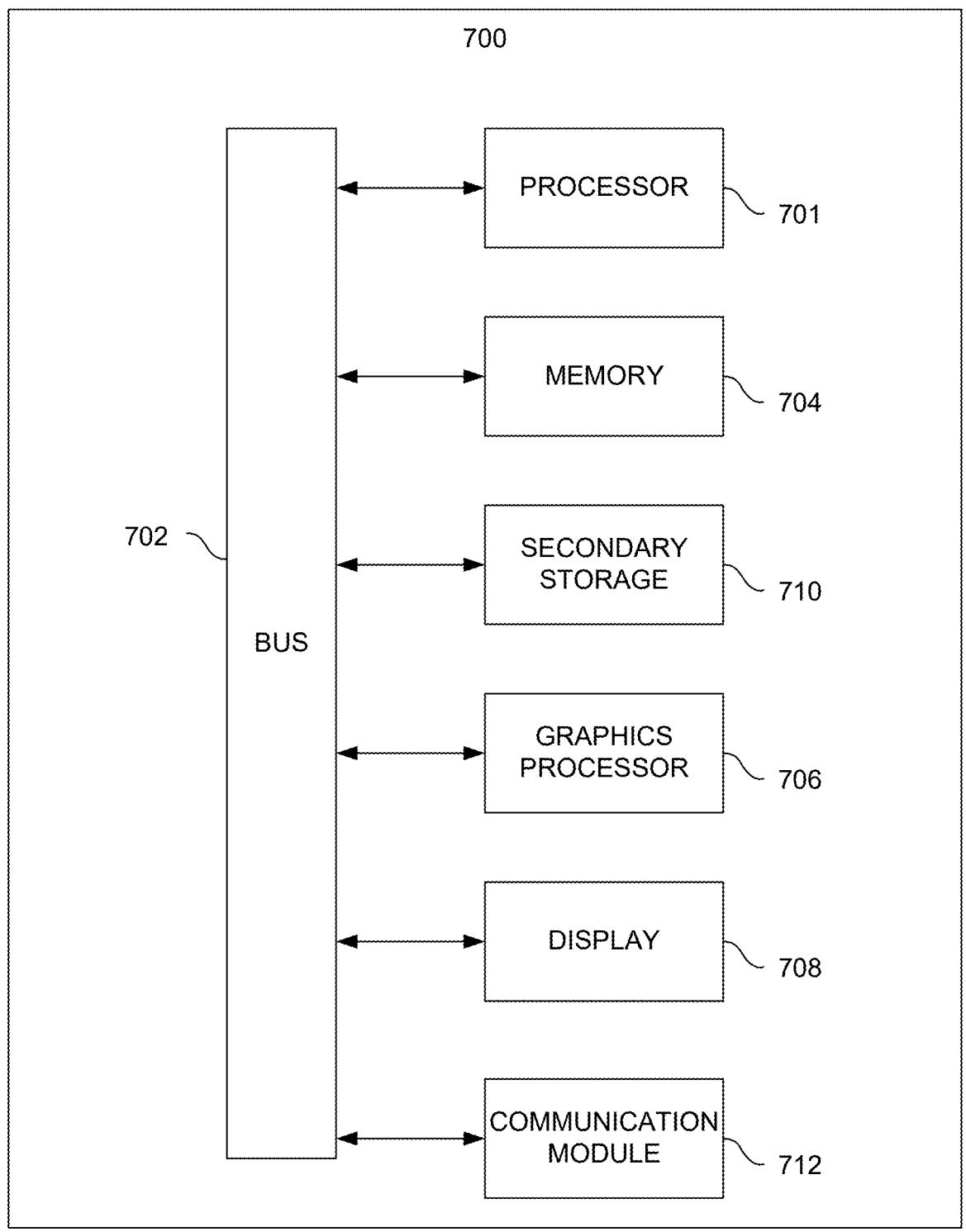
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   receive, by a service and network orchestrator, a natural language input provided by a user that includes a command associated with a network service;
   process, by the service and network orchestrator, the natural language input to derive therefrom an intent that includes a formal description of a request associated with the network service, the intent being defined in a first format associated with a first standard used by the service and network orchestrator for modeling and management of network services;
   provide the intent defined in the first format to a microservice associated with a Topology and Orchestration Specification for Cloud Applications (TOSCA)-based orchestrator that uses a TOSCA-based standard for modeling and management of network services;
   translate, by the microservice, the intent defined in the first format to a different second format associated with the TOSCA-based standard to form the intent defined in the second format; and
   output, by the microservice, the intent defined in the second format to the TOSCA-based orchestrator for performing one or more actions in a network that achieve the intent as defined in the second format.

2. The non-transitory computer-readable media of claim 1, wherein the first format is configured to define intents using a first proprietary set of parameters.

3. The non-transitory computer-readable media of claim 2, wherein the first proprietary set of parameters include one or more of properties, constraints, expectations, goals, or reports.

4. The non-transitory computer-readable media of claim 2, wherein the intent defined in the first format is translated to the second format by translating parameters of the intent defined in the first format.

5. The non-transitory computer-readable media of claim 4, wherein the second format is configured to define intents using a second proprietary set of parameters, and wherein parameters of the intent defined in the first format are translated to parameters included in the second proprietary set of parameters.

6. The non-transitory computer-readable media of claim 5, wherein the second proprietary set of parameters includes one or more of data types, properties, artifacts, capabilities, requirements, relationships, interfaces, nodes, or policies.

7. The non-transitory computer-readable media of claim 1, wherein the microservice translates the intent defined in the first format to the second format by using at least one of mappings or policies.

8. The non-transitory computer-readable media of claim 7, wherein the microservice translates the intent defined in the first format to the second format by further using one or more of calculations, constraints, requirements, or capabilities.

9. The non-transitory computer-readable media of claim 1, wherein the microservice translates the intent defined in the first format to the second format by using one or more of textual mapping of properties, wildcard mapping, or rule-based mapping.

10. The non-transitory computer-readable media of claim 1, wherein the microservice translates the intent defined in the first format to the second format by using machine learning based mapping.

11. The non-transitory computer-readable media of claim 1, wherein the microservice translates the intent defined in the first format to the second format by using generative artificial intelligence based mapping.

12. A method, comprising:
    at a computer system:
    receiving, by a service and network orchestrator, a natural language input provided by a user that includes a command associated with a network service;
    processing, by the service and network orchestrator, the natural language input to derive therefrom an intent that includes a formal description of a request associated with the network service, the intent being defined in a first format associated with a first standard used by the service and network orchestrator for modeling and management of network services;

providing the intent defined in the first format to a microservice associated with a Topology and Orchestration Specification for Cloud Applications (TOSCA)-based orchestrator that uses a TOSCA-based standard for modeling and management of network services;

translating, by the microservice, the intent defined in the first format to a different second format associated with the TOSCA-based standard to form the intent defined in the second format; and outputting, by the microservice, the intent defined in the second format to the TOSCA-based orchestrator for performing one or more actions in a network that achieve the intent as defined in the second format.

13. A system, comprising:

a non-transitory memory storing instructions; and one or more processors in communication with the non-transitory memory that execute the instructions to:

receive, by a service and network orchestrator, a natural language input provided by a user that includes a command associated with a network service;

process, by the service and network orchestrator, the natural language input to derive therefrom an intent that includes a formal description of a request associated with the network service, the intent being defined in a first format associated with a first standard used by the service and network orchestrator for modeling and management of network services;

provide the intent defined in the first format to a microservice associated with a Topology and Orchestration Specification for Cloud Applications (TOSCA)-based orchestrator that uses a TOSCA-based standard for modeling and management of network services;

translate, by the microservice, the intent defined in the first format to a different second format associated with the TOSCA-based standard to form the intent defined in the second format; and output, by the microservice, the intent defined in the second format to the TOSCA-based orchestrator for performing one or more actions in a network that achieve the intent as defined in the second format.

14. The non-transitory computer-readable media of claim 1, wherein the microservice is configured to translate intents defined in formats associated with standards used by a plurality of different service and network orchestrators to the second format associated with the TOSCA-based standard used by the TOSCA-based orchestrator.

15. The non-transitory computer-readable media of claim 14, wherein the microservice is an adaptor of the TOSCA-based orchestrator that stores translation logic as a pluggable and extendable knowledge base for translating the intents defined in the formats associated with the standards used by the plurality of different service and network orchestrators to the second format associated with the TOSCA-based standard used by the TOSCA-based orchestrator.

* * * * *